United States Patent [19]
Howard

[11] 3,959,814
[45] May 25, 1976

[54] METHOD AND APPARATUS FOR TABULATING THE CONTENTS ON A RECORD MEDIUM BY USE OF TIME

[76] Inventor: David G. Howard, 137 Monticello Ave., Annapolis, Md. 21401

[22] Filed: July 31, 1974

[21] Appl. No.: 493,640

[52] U.S. Cl. ................................. 360/13; 58/147; 360/72
[51] Int. Cl.² .................... G11B 15/18; G11B 27/02
[58] Field of Search ............. 129/100.1 R, 100.1 A, 129/100.1 PS; 360/72, 74, 90, 137; 58/152 R, 38 D, 38 DA, 38 DB, 152 T, 147; 200/38 FA, 38 FB; 340/309.1, 13; 346/20

[56] References Cited
UNITED STATES PATENTS

| | | | |
|---|---|---|---|
| 2,562,546 | 7/1951 | Gray | 200/38 FB |
| 2,779,826 | 1/1957 | Scott | 360/137 |
| 2,803,300 | 8/1957 | Warkentier | 58/147 |
| 3,109,898 | 11/1963 | Gray | 360/13 |
| 3,258,908 | 7/1966 | Fisher | 58/145 R |
| 3,467,791 | 9/1969 | Bolick, Jr. | 129/100.1 R |
| 3,518,379 | 6/1970 | Walburn | 179/100.1 PS |
| 3,591,731 | 7/1971 | Stancil | 129/6 JA |
| 3,757,057 | 9/1973 | Fleming | 179/100.1 R |

Primary Examiner—Vincent P. Canney
Attorney, Agent, or Firm—Scrivener Parker Scrivener and Clarke

[57] ABSTRACT

A tape recorder, a clock and a plurality of switches which can be arranged so that the clock and tape recorder can be energized independently of each other or in unison so that the clocck will serve as an elapsed time indicator.

3 Claims, 3 Drawing Figures

METHOD AND APPARATUS FOR TABULATING THE CONTENTS ON A RECORD MEDIUM BY USE OF TIME

This invention relates to a method and apparatus for making a table of contents, tabulating or editing information recorded on media such as magnetic tapes, photographic films or phonographic discs.

Where records consisting of a series of recorded messages of varying length recorded in succession on the record are to be retained in a permanent library, it is almost essential that there be for each record a table of its contents so that a user can retrieve as quickly as possible any particular message he may wish to hear. Such a table should include a symbol, such as a number, for each record, a series of sequential numbers, one for each message on the record, the subject matter of each message, an indication of where the message may be found on the record and an indication of the length of the message.

Heretofore there has simply been no reliable system for producing for any type of record a table of contents of the foregoing nature.

For example, it is essentially impossible to establish a table of contents, as generally described above, for a cassette type tape record. Built-in distance or tape-length measurers as used on reel-to-reel tape recorders have not been satisfactory for a variety of reasons, a prime one being that because the distance measurer is driven by the same mechanism which drives or advances the record, whatever inaccuracies may exist in that drive appear accumulatively in the distance indicator. Though the indicator may be reliably used with records previously tabulated on that particular machine, the measurer cannot be relied on for use with a record previously tabulated on another machine.

The broad object of the present invention is to eliminate problems of the foregoing nature by providing a simple, inexpensive and practically universal means for producing a comprehensive, accurate table of contents for any type of record, be it cassette, cartridge, or reel-to-reel tapes, photographic film or phonographic disc.

More particularly it is an object of the invention to accomplish the foregoing by using in place of linear measuring means, the quantity time as the primary reference factor in the tabulation of the recorded contents of a record.

Still another object of the invention is to use time as the reference factor for establishing a table of contents for a record and wherein time is derived from an accurate timepiece which is operated synchronously with but independently of the record transport mechanism whereby any inaccuracies in such mechanism cannot appear as a factor in the ultimate table of contents derived from the timepiece.

Other objects and their attendant advantages will become apparent when the following detailed description is read in conjunction with the accompanying drawings wherein.

Figure 1:
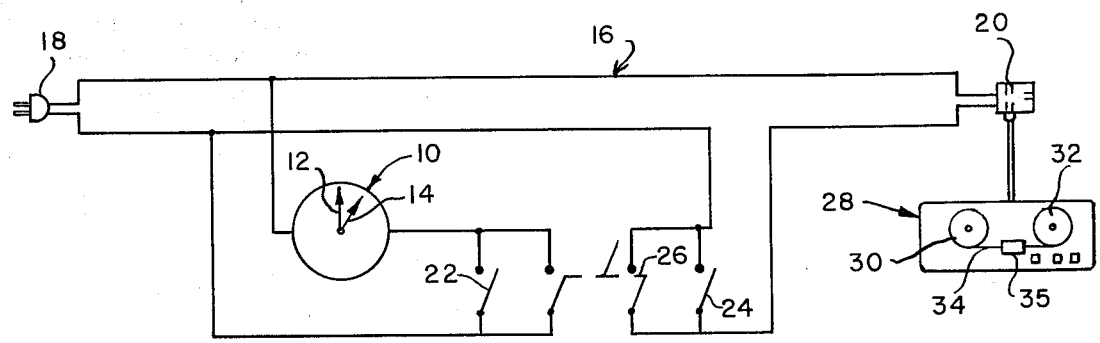
FIG. 1 is a circuit diagram of a tabulating or editing arrangement constructed in accordance with the invention.

Referring now to the drawings and with particular reference to FIG. 1 the numeral 10 designates a timepiece which may be an electric clock having hands 12, 14 for indicating at least minutes and seconds. A third hour hand may be included but for most purposes, the indication of minutes and seconds is sufficient for tabulating records of usual length. In lieu of an electric clock having conventional hands, the timepiece could be an electronic digital clock having no moving parts, or the clock could even be of the mechanical variety such as are used for timing chess matches or athletic events. In any event, the timepiece must have the capability of effecting starting and stopping of the time indicating means, such as the hands 12, 14 at the instant the start-stop control such as an electric switch is operated. In other words, movement of the hands should start and stop at the instant a switch or other control is operated and without any detectable delay in starting or overshoot when stopping due to inertia of the driving mechanism or for other reasons. An electronic digital clock meets this requirement or the timepiece could be an electric clock having a suitable starting winding with either a spring engaged, solenoid release brake or with frictional characteristics whereby the hands are stopped at almost the same instant that power to the clock's motor is cut off.

In the preferred arrangement of FIG. 1 the clock 10 is connected in an electric circuit 16 having a plug 18 at one end and a multiple socket unit 20 at the other end. As can be seen, the circuit from the plug 18 to the clock can be controlled by a single pole switch 22 and the circuit to the multiple socket unit 20 can be controlled separately by a second single pole switch 24. When it is desired to energize or de-energize the clock and socket unit simultaneously, the switches 22 and 24 may be opened and a single throw, double pole switch 26 may be operated.

The socket unit 20 is adapted to receive one or more plugs of conventional recorder/playback units one of which is shown schematically at 28. The recorder has a pair of reels 30, 32 whose tape 34 is movable past recording and playback heads 35 by conventional tape transport means in the apparatus. Any additional recorder units which are plugged into the socket unit would be operated simultaneously with the recorder unit 28 upon operation of either the switch 24 or the switch 26.

Figure 2:
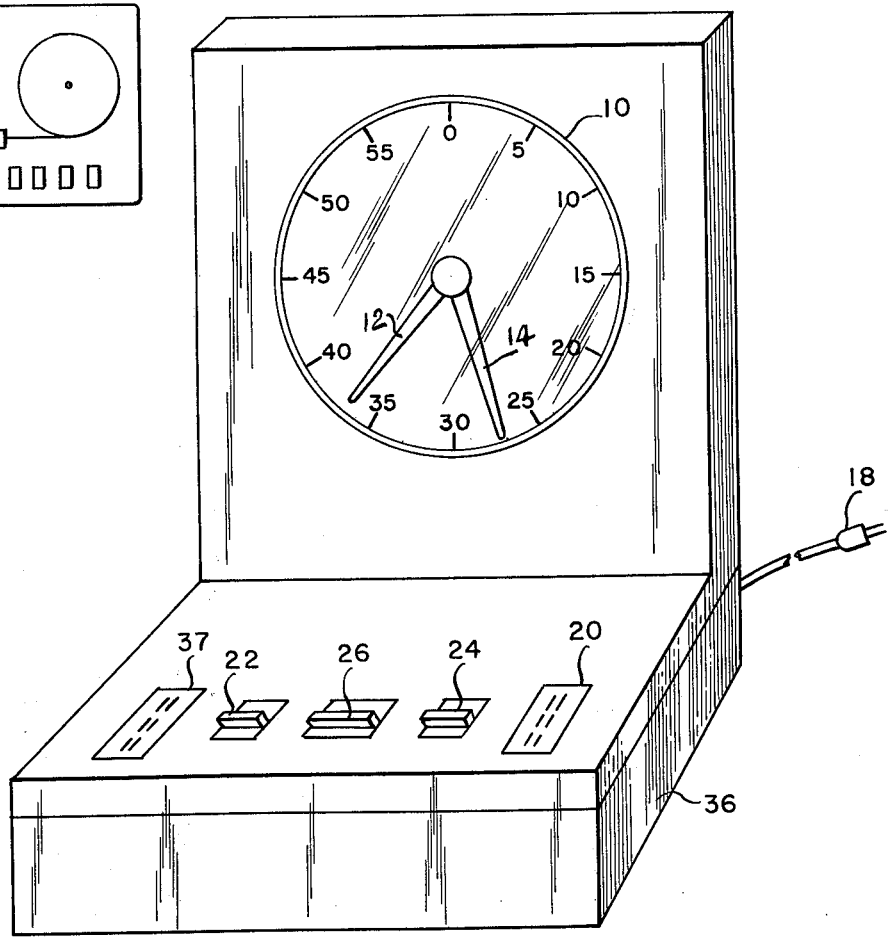
FIG. 2 is a perspective view of a time tabulating control unit of the invention which may be used with existing recording equipment.

FIG. 2 illustrates a timer unit of the invention. As shown, the unit is portable and may be used with existing recording apparatus without changes of any kind being required for that apparatus. The unit of FIG. 2 includes the timepiece 10 having minute and second hands 12, 14. The timepiece is mounted vertically on the rear of a console 36 which includes adjacent one side edge the multiple socket unit 20 and adjacent the other a multiple socket 37 into which additional timepieces might be plugged. The unit has a conventional plug 18 and the single pole switches 22, 24 for separately energizing the clock and multiple socket unit 20, respectively, are on the console and between them is the single throw, double pole switch 26.

Though the invention is equally applicable for use with magnetic tapes, photographic films and phonographic disc type records, its operations will be described in connection with a magnetic tape which will be assumed to have had recorded thereon in succession a number of different pieces of information of varying lengths. It will be further assumed that the recordings or at least part of them are to constitute substantially permanent recordings and it is desired to derive a permanent table of contents of the tape which may be referred to to determine where on the tape any particular message is located.

Now, when the recorder 28 is plugged into one of the sockets 20 the switch 24 may be momentarily closed to ensure that the recorder is operating correctly whereupon the tape is rewound to the beginning and the switch 24 opened. The minute hand of the timepiece may then be manually set at zero by the usual setting knob (not shown) and the switch 22 can be momentarily closed until the second hand 14 is also at zero, this operation constituting a test of the clock. When indexing of the tapes is to begin, the double pole switch 26 is closed whereupon the timepiece and the recorder, in play-back mode, are simultaneously started. The operator listens to the first message and at its conclusion he opens the switch 26 which simultaneously stops the clock and the recorder. On a suitable form, the operator then writes down the necessary information required for a table of contents as outlined above and including the number of minutes and seconds which elapsed during the playback of the first message. He then closes the switch 26 which again simultaneously starts the timepiece and the recorder and the operator listens until the end of the second message is reached whereupon he opens the switch and again notes the subject matter and the total of the elapsed time to the end of the second message, with the process being repeated for each message on the tape. At the conclusion of this operation, a table of the contents of the tape has been produced which may be stored with the tape or separately catalogued for future reference as to where a particular message appears on the tape and how long it will take to reach its beginning point if the tape is played back from the start. Though playing from the start in conjunction with the timepiece is the most accurate method of determining where a particular message begins, it clearly is not always practical or desirable to play back all of the preceding messages in order to listen to a selected one. It has been found that with slight experience an operator can closely estimate the amount of tape wound onto a takeup reel for a given period of normal playback time. Thus, if a desired message according to the tabulation begins at 16 minutes and 35 seconds from the start of the tape, an operator can close the switch 24 and thereafter operate the recorder in its fast-forward mode until he estimates that about 15 minutes of tape at normal playback speed has been wound onto the takeup reel whereupon the operator switches the recorder to its normal playback mode until the beginning of the desired message is heard. Should the tabulation indicate that the message runs for 4 minutes and 25 seconds, say, the operator may want to stop the recorder by opening the switch 24 and then set the timepiece hands at zero if they are not already in this position or conveniently he may wish to set the hands at 16 minutes and 35 seconds thus returning to normal tabulation, and thereafter with both switches 22 and 24 open, the operator may close the double pole switch 26 to start the recorder and timepiece simultaneously with the timepiece acting as a monitor for the recorder should the operator wish to stop playback before the next message on the tape begins. Knowing in advance the precise time for a particular message to play-back can be extremely useful in certain types of demonstrations where each of the recorded pieces of information may be of short duration and difficult to distinguish from a succeeding recorded piece of information. For example, where rare bird calls have been recorded in succession and the operator does not want listeners to confuse a later recorded bird call of one species with an earlier recorded call he might want to stop playback exactly at the end of the first recording and he will be able to determine this exact point from the timepiece.

Figure 3:
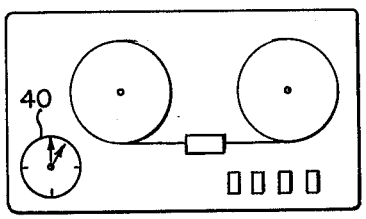
FIG. 3 is a schematic view of a recorder incorporating a timepiece as an integral part thereof.

Though the unit shown in FIG. 2 is particularly desirable because it is readily potable and may be used with any type of recorder, be it cassette, cartridge or reel-to-reel type recorder, a photographic film or a phonographic disc, or an or all of these simultaneously, and without requiring any modification to the existing equipment, instead of being a separate unit as in FIG. 2, the timepiece could be built directly into the recorder as shown schematically at 40 in FIG. 3 where the timer would be used with, or in lieu of the linear type measurers now provided on reel-to-reel type tape recorders.

When a recorded tape is to be edited, an editor may want to remove from the tape material which is to be entirely discarded, remove desired tape from a reel for use elsewhere, transfer desired tape to a different position on the same reel, or transfer material from one reel to another. Where the unedited tape has been first tabulated as described above, the operator may erase a message whose playback time is determined from the index and on the erased portion of the tape the editor may wish to insert new material whose playback time is equal to the erased message. Where a portion of the tape is to be removed bodily, the operator can determine the length of tape which is to be removed by referencing the index. In any of the editorial procedures, the invention is clearly helpful in ensuring that the tape is properly edited without unwanted deletion or other error.

After a time index or table has been prepared for a particular tape in accordance with the above procedure, the recorded information may be recorded on a second tape which is transported at a greater speed than the first tape during the recording process of the second tape. Though additional length of the second tape will be required, the time index for the first tape will apply equally well as the time index for the second tape. Instead of tabulating one record separately the multi-socket 20 permits the simultaneous tabulation of one record while recording the same material from that record onto records of other recorders plugged into the sockets of the member 20. Even if these recorders operate at different speeds, the time table prepared for the already recorded record serves equally for those records being recorded from the first record.

Where disparate musical or other pieces are pre-recorded on special tapes, particularly of the reel-to-reel variety, the only index presently being supplied by the tape producer is a sequential list of the programs on the tape with no indication of where a particular piece can be found on the tape, how long each piece is, or even on what side of the tape the piece is recorded. It would be of great convenience for a listener to know where each piece is located and this is particularly important where pre-recorded tapes are used for audio-visual instruction in school or where a student of music wishes to study only one selection of several on a tape and under present circumstances, too much of the learning period is wasted searching for the wanted program. By the use of the present invention, a producer may easily and inexpensively amplify his index and thereby eliminate the time-wasting exercise which is now called for in the use of tapes or other records in the learning process.

Though the invention is useful for indexing or tabulating messages already recorded on a medium, it can also be used during the recording process, for example, during dictation, with the timepiece being started and stopped by the dictator as he starts and stops the recording instrument by the usual switch carried by the recording microphone. The dictator can note the elapsed time for recoding each message by writing down the time observed on the timepiece or perhaps making a mark on a suitable printed index strip bearing time indicia and mounted on or near the recording instrument.

Where a mechanical clock is used rather than an electrical one,, a suitable mechaical linkage between the switch on the console for controlling the recorder and start-stop lever of the mechanical timepiece should be employed. These and other changes and modifications may be resorted to without departing from the scope and spirit of the appended claims.

What is claimed is:

1. In combination with recording mechanism, apparatus enabling tabulation from said recording mechanism of a plurality of messages of varying length recorded in sequence on a record medium operated by said mechanism comprising an electrical circuit, means for selectively connecting said circuit to a source of electrical energy, an electrical time piece in said circuit constructed and arranged to indicate elapsed time in pre-determined units of time, first switch means in said circuit for selectively connecting said time piece through said circuit to said source of energy when said circuit is connected thereto, means releasably connecting said recording mechanism to said electrical circuit in parallel with said time piece, second switch means in said circuit operable independently of said first switch means for selectively connecting said recording mechanism through said circuit to said source of energy when said circuit is connected thereto, and third switch means in said electrical circuit operable independently of said first and second switch means for selectively simultaneously connecting said time piece and said recording mechanisms to said source of energy when said circuit is connected thereto.

2. The tabulating means of claim 1 wherein said electrical circuit, said time piece and all of said switch means are carried by a portable console, said means for connecting said circuit to a source of energy comprising electrical plug means carried by said console for connecting said circuit, time piece and switch means to said electrical source, and the means releasably connecting said recording mechanism to said circuit comprising socket means connected to said circuit and carried by said console and receiving plug means connected to said recording mechanism.

3. The apparatus of claim 2 wherein said socket means is a multi-socket enabling the simultaneous operation of a plurality of recording mechanism with said time piece.

* * * * *